United States Patent
Phua et al.

(10) Patent No.: US 8,621,931 B2
(45) Date of Patent: Jan. 7, 2014

(54) MULTIPOINT LASER VIBROMETER WITH SINGLE DETECTOR

(75) Inventors: Poh Boon Phua, Singapore (SG); Yu Fu, Singapore (SG)

(73) Assignee: DSO National Laboratories, Singapore (SG)

( * ) Notice: Subject to any disclaimer, the term of this patent is extended or adjusted under 35 U.S.C. 154(b) by 353 days.

(21) Appl. No.: 13/069,281

(22) Filed: Mar. 22, 2011

(65) Prior Publication Data

US 2012/0240682 A1 Sep. 27, 2012

(51) Int. Cl.
*G01N 29/04* (2006.01)
*G01B 9/02* (2006.01)

(52) U.S. Cl.
USPC ............... 73/643; 73/596; 73/657

(58) Field of Classification Search
USPC ............ 73/643, 596, 655, 657; 356/484, 502; 359/305
See application file for complete search history.

(56) References Cited

U.S. PATENT DOCUMENTS

| | | | | |
|---|---|---|---|---|
| 4,789,241 A * | 12/1988 | Michal et al. | ............ | 356/464 |
| 6,972,846 B2 * | 12/2005 | Lal et al. | ............ | 356/486 |
| 7,116,426 B2 * | 10/2006 | Lal et al. | ............ | 356/486 |
| 7,477,398 B2 | 1/2009 | Lal et al. | | |
| 7,684,110 B2 * | 3/2010 | Pannell et al. | ............ | 359/305 |
| 7,894,074 B2 * | 2/2011 | Lawall | ............ | 356/485 |
| 2009/0147267 A1 * | 6/2009 | Lawall | ............ | 356/502 |
| 2009/0251706 A1 | 10/2009 | Rembe et al. | | |
| 2012/0266680 A1 * | 10/2012 | Boyer et al. | ............ | 73/655 |

FOREIGN PATENT DOCUMENTS

WO    WO2009044387    *    4/2009

OTHER PUBLICATIONS

Koichi Maru, Kohjiro Kobayashi, and Yusaku Fujii, Multi-Point Differential Laser Doppler Velocimeter Using Arrayed Waveguide Gratings With Small Wavelength Sensitivity. Department of Electronic Engineering, Gunma University, Jan. 4, 2010/vol. 18, No. 1/Optics Express pp. 301-308.
A. Waz, P.R. Kaczmarek, M.P. Nikodem, K.M. Abramski Laser & Fibre Electronics Group, Wroclaw University of Technology; Proc. Of SPIE vol. 7098 (2008) p. 1-6.
C. Cristalli, N. Paone, R.M. Rodriguez; Mechanical Fault Detection or Electric Motors by Laser Vibrometer and Accelerometer Measurements, Mechanical Systems and Signal Processing 20 (2006); p. 1350-1361. www.sciencedirect.com.
H-J Foth, M. Barmann, and N. Stasche; Clinical Application of Laser Doppler Vibrometry. SPIE vol. 2970, (Mar. 2010) p. 182-187.
James M. Kilpatrick and Vladimir Markov; Matrix Laser Vibrometer for Transient Modal Imaging and Rapid Non-destructive Testing, Proc. Of SPIE vol. 7098, 709809, (2008); p. 1-12.

(Continued)

*Primary Examiner* — J M Saint Surin
(74) *Attorney, Agent, or Firm* — Wells St. John P.S.

(57) ABSTRACT

A laser vibrometer makes non-contact measurements of vibrations of a target. A laser produces a laser beam, and a beamsplitter splits the laser beam into a reference beam and a first target beam. A first frequency shifter/splitter splits the first target beam into a pair of target beams each having a frequency different than a frequency of the other target beams. The target beams are reflected from the target to a detector, and the reference beam is combined with the target beams such that the detector receives the target beams and reference beam together.

13 Claims, 2 Drawing Sheets

(56) References Cited

OTHER PUBLICATIONS

Jongpil La, Jieun Choi, Semyung Wang, Kyoungsuk Kim, Kyihwan Park; Continuous Scanning Laser Doppler Vibrometer for Mode Shape Analysis, 2003 Society of Photo-Optical Instrumentation Engineers, Opt. Eng. 42(3) p. 730-737.

Laura B. Biedermann, Ryan C. Tung, Arvind Raman and Ronald G. Reifenberger; Nanotchnology 20 (2009) 035702 p. 1-6.

P. Castellini, M. Martarelli, E.P. Tomasini; Laser Doppler Vibrometry: Development of Advanced Solutions Answering to Technology's Needs. Mechanical Systems and Signal Processing 20 (2006) p. 1265-1285. www.sciencedirect.com.

Raffaella Di Sante, Lorenzo Scalise; A Novel Fiber Optic Sensor for Multiple and Simultaneous Measurement of Vibration Velocity. Review of Scientif Instruments vol. 75, No. 6 Jun. 2004, p. 1952-1958.

* cited by examiner

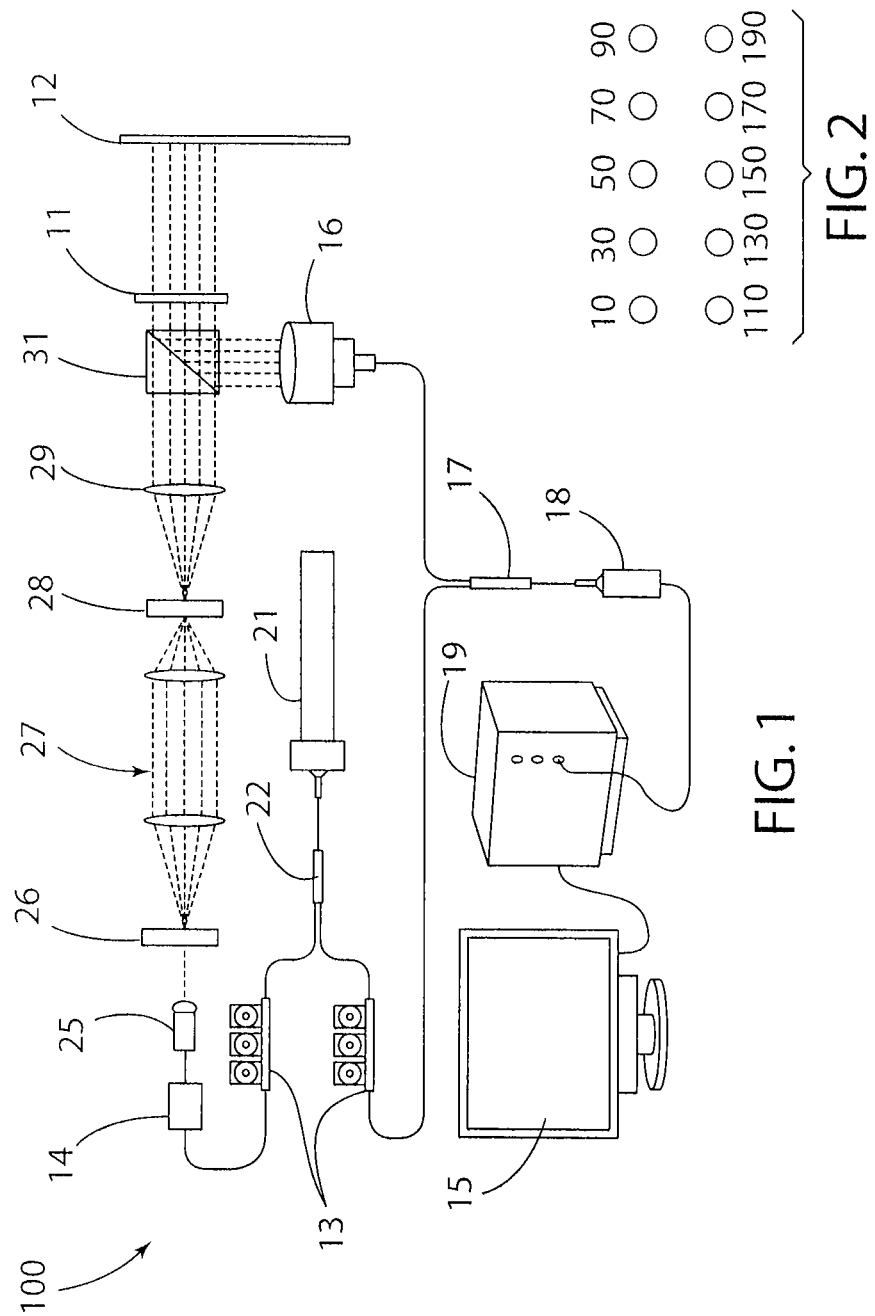

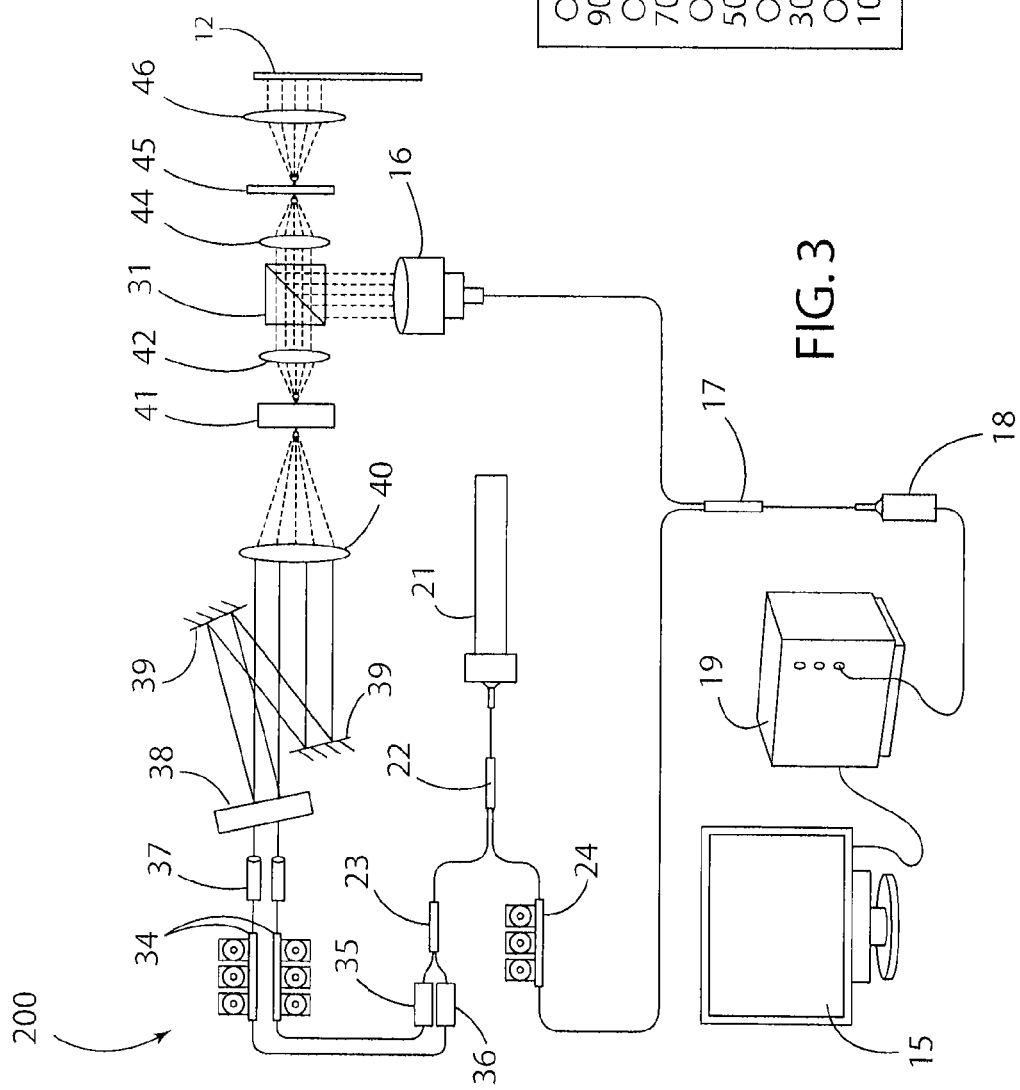

MULTIPOINT LASER VIBROMETER WITH SINGLE DETECTOR

FIELD OF THE INVENTION

The invention relates generally to laser vibrometers, and more specifically to laser vibrometers suitable for measuring transient events.

BACKGROUND OF THE INVENTION

A laser vibrometer or laser Doppler vibrometer is a scientific instrument that is used to make non-contact measurements of vibration of a surface. Generally, a laser beam is directed at the surface of interest, and scattered light from the surface is collected and interfered with the reference beam on a photodetector, typically a photodiode. The vibration amplitude and frequency are extracted from the Doppler shift of the laser beam frequency due to the motion of the surface. The output of a laser vibrometer is generally a continuous analog voltage that is directly proportional to the target velocity component along the direction of the laser beam.

One advantage of a laser vibrometer over similar measurement devices such as an accelerometer is that the laser vibrometer can be directed at targets that are difficult to access, or that may be too small or too hot to attach a physical transducer. Also, the laser vibrometer makes the vibration measurement without mass-loading the target, which is important for MEMS devices.

However, older laser vibrometers make measurements at a single point. It is often desirable to make measurements at multiple points on a target. While it is possible to scan the laser beam across the surface of the item of interest, this is a relatively slow process, and transient events that occur quicker than the time it takes to scan through a series of points cannot be measured. In response to this problem, multichannel and multipoint laser doppler vibrometers have been developed, where the target beam is split into a plurality of target beams. However, such multipoint laser doppler vibrometers are relatively expensive, as a separate detector is required for each of the plurality of target beams.

It would be desirable to provide a laser vibrometer which is of simple construction, which is self-synchronized, and which can readily measure non-repeatable or transient events.

SUMMARY OF INVENTION

In accordance with a first aspect, a laser vibrometer makes non-contact measurements of vibrations of a target. A laser produces a laser beam, and a beamsplitter splits the laser beam into a reference beam and a first target beam. A first frequency shifter/splitter splits the first target beam into a pair of target beams each having a frequency different than a frequency of the other target beams. The target beams are adapted to be reflected from the target to a detector, and the reference beam is adapted to be combined with the target beams such that the detector receives the target beams and reference beam together.

From the foregoing disclosure and the following more detailed description of various preferred embodiments it will be apparent to those skilled in the art that the present invention provides a significant advance in the technology of laser vibrometers. Particularly significant in this regard is the potential the invention affords for providing a laser vibrometer with relatively low cost and which can measure transient events. Additional features and advantages of various preferred embodiments will be better understood in view of the detailed description provided below.

BRIEF DESCRIPTION OF DRAWINGS

FIG. 1 is a schematic view of a laser vibrometer in accordance with one embodiment.

FIG. 2 is a schematic of a beam array generated by the embodiment of FIG. 1.

FIG. 3 is a schematic view of a laser vibrometer in accordance with another embodiment.

FIG. 4 is a schematic of a beam array generated by the embodiment of FIG. 3.

It should be understood that the appended drawings are not necessarily to scale, presenting a somewhat simplified representation of various preferred features illustrative of the basic principles of the invention. The specific design features of the laser vibrometer as disclosed here, including, for example, the specific frequency of the laser, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the laser Doppler vibrometer disclosed here. The following detailed discussion of various alternative and preferred features and embodiments will illustrate the general principles of the invention with reference to a laser vibrometer suitable for use in measuring transient events. Other embodiments suitable for other applications will be apparent to those skilled in the art given the benefit of this disclosure.

Laser Doppler vibrometers have numerous application areas such as, for example, in structural dynamics measurements and for quality control purposes in a production setting. Laser Doppler vibrometers are particular useful for modal and vibrational analysis, rotating structures, on-line quality control, structural damage detection, microsystems diagnostics, calibration, and damage detection in structures. Laser vibrometers may also be used in other applications such as in a biomedical setting for eardrum diagnostics, bone crack propagation, and other physiological measurements, or in nature where sensitive and flexible measurements that do not disturb the subject are required to investigate a vibrating system.

FIG. 1 shows one embodiment of a laser vibrometer 100 in schematic form. The laser vibrometer makes multipoint, non-contact measurements of the vibration of a target 12. A laser 21 generates a laser beam. The laser may comprise, for example, an 80 mW distributed feedback (DFB) laser. The laser beam is split by a beamsplitter 22 into a target beam and a reference beam. As shown in FIG. 1, the reference beam is routed to a detector 18. The detector 18 can comprise, for example, a high speed photodetector. The target beam is routed through one or more frequency shifter/splitters as discussed in greater detail below. Optionally a polarization controller 13 may be provided for both the target beam and the reference beam to help make sure the target beam and reference beam have the same polarization. In the embodiment shown in FIG. 1, the polarization controllers 13 are optically positioned after the beamsplitter 22.

The term "optically positioned" is understood here to mean that an element is positioned between a pair of other elements with respect to travel of laser light, even if such an element is not physically between the pair of other elements. Thus, the first frequency shifter 26 is shown in FIG. 1 to be optically positioned between laser 21 and second frequency shifter 28, for example.

Optionally a shifter 14 may be used to shift the frequency of the target beam. For example, the frequency of the target beam may be shifted by 50 MHz, countering the negative frequency shift of the Raman-Nath frequency shifter 26 and also helping overcome problems with crosstalk during digital and analog decoding. In the embodiment shown in FIG. 1, the shifter is optically positioned between the laser 21 and the first frequency shifter/splitter 26. The shifter can comprise, for example, an acousto-optic modulator. Optionally a lens 25, such as a gradient index (GRIN) lens may be positioned between the shifter and the first frequency shifter/splitter to help reduce aberrations and collimate the target beam.

In accordance with a highly advantageous feature, the first frequency shifter/splitter 26 splits the target beam up into a plurality of target beams, and each target beam has a frequency different than the other target beams. This accomplishes two things. First it allows for multipoint measurement of a target 12. Such multiple measurements are referred to as spatial encoding, meaning that the vibration information of the target at different points is encoded to different frequency bands. Second, since the frequencies are all different, a single detector may be used to process all target beams with the reference beam. Since the frequencies are spaced apart from one another, they do not interfere with one another when processed. Such an array of target beams is self-synchronized; no additional steps or hardware is required for synchronization of multiple signals.

In the embodiment shown in FIG. 1, first frequency shifter/splitter 26 can comprise, for example a Raman-Nath frequency shifter which acts to split the target beam into five target beams. From there the five target beams are routed through a telescope system 27 that determines a width-height ratio of the array of target beams. From there the target beams are routed to a second frequency shifter/splitter 28. The second frequency shifter/splitter is optically positioned between the first frequency shifter/splitter 26 and the target 12, and can split the five incoming target beams into more target beams. The second frequency shifter can comprise, for example, a Bragg frequency splitter which splits the plurality of target beams into more target beams to form an array of target beams. In the embodiment of FIG. 1, the number of target beams is increased from five to ten, each with a frequency different than the other target beams. FIG. 2 shows an example of the array for ten target beams of varying intensity, with the frequencies measured in MHz. Each frequency of a target beam is different from every other target beam. Such a configuration advantageous allows for measurement of transient events, including, for example, simultaneous velocity and displacement measurements at different points on a target.

A polarizing beamsplitter 31 may be optically positioned between the frequency shifter/splitters and the target. The beamsplitter 31 routes the array of target beams to the target 12. The array of target beams are reflected back to the beamsplitter 31 and routed to a beam receiver 16. Polarized laser beam light passes through quarter-wave plate 11 twice, thereby changing the polarization of the laser beams by 90 degrees, and ensuring that the reflected beams will be routed by the polarized beam splitter 31 to beam receiver 16. The beam receiver is used to narrow the array of target beams and may be, for example, a single mode (non-adjustable) pigtailed beam receiver. From the beam receiver, the target beams are interfered with the reference beam at single mode fibre coupler 17. The combined signals are sent together to a photodetector, typically a high speed photodetector. From there, the signal is to a preamplifier 19, such as an NI preamplifier, and high speed digitizer with processor 15 for digital decoding. The spectrum of the signal and the retrieved displacement between two or more points can be displayed.

In addition to the interference signal between the plurality of target beams and the one reference beam, there may also be cross talk between the plurality of target beams. The frequency shifts of FIG. 2 help separate the useful signal from the cross talk. Further, the reference beam can have a relatively high intensity when compared with the plurality of target beams. Beamsplitter 22 may split energy 99:1, for example. The target beam may have 99% energy and the reference beam have only 1% energy. However, even only 1% energy is still high enough to dominate a resulting spectrogram generated at the processor 15 as the target beams received by the receiver have much lower energy than the reference beam. In combination with application of Windowed Fourier Ridge (WFR) processing or wavelet ridge processing by the processor, signals with the highest energy at certain preselected frequency ranges can be obtained over the cross talk, allowing for determination of a Doppler frequency shift corresponding to position of the target. Other processing techniques suitable for obtaining information about the Doppler shift of the target will be readily apparent to those skilled in the art given the benefit of this disclosure.

Demodulation of the signal received by the photodetector may be done by analog demodulation or digital demodulation. Analog demodulation normally demodulates an analog input signal by use of a phase locked loop (PLL) technique. The output as a result of such demodulation is an analog signal whose voltage varies in proportion to the velocity of the measurement point.

In digital demodulation, a high-speed A-D converter is used to digitize the interference signal. Because of the high carrier frequencies of laser beams, a sampling rate should be high enough (e.g., 1 GS/s) to satisfy the Nyquist-Shannon sampling theorem. Hence, a long signal is obtained when a high frequency resolution is required. Digital demodulation to decode the 1-D signal (target beams and reference beams) can be accomplished by Fourier analysis or Windowed Fourier Ridge, for example. Each processing algorithm can be used to obtain the velocity and displacement at different points from the 1-D (interference) signal. Other processing algorithms will be readily apparent to those skilled in the art given the benefit of this disclosure.

With Fourier analysis, the digitized signal is first transformed, and one side of the spectrum is filtered with different bandpass filters which are designed according to the several frequencies of the target beams and the velocity measurement range. The filtered spectrums are inverse-transformed to obtain the wrapped phase at each frequency band. The phase values are then unwrapped along the time axis to obtain the displacements at different frequency bands, in other words, at different points. For a long 1-D signal, it is difficult to process the whole length by a normal computer. Hence, it is necessary to split the signal into several parts and process separately. A continuous displacement can still be obtained by connecting the separated results together.

The Fourier analysis accuracy increases when the bandpass filter is narrow. However, the bandpass filter in laser Doppler vibrometers is determined by the velocity measurement range. The wider the filter, the more serious the noise. This affects the results in both analog and digital demodulation systems.

A windowed Fourier ridge (WFR) technique maps a 1D temporal signal to a 2D time-frequency plane and extracts the signal's instantaneous frequency with the highest energy. It can be more effective to remove the noise within the selected frequency band. This is an advantage of the WFR over the Fourier analysis. When a useful signal is mixed with cross talk signals at certain frequency band, with WFR it is still possible to extract the instantaneous frequency of the useful signal when its energy is much higher than the mixed cross talk signals. As WFR includes a frequency scanning, processing time is larger compared to Fourier analysis. However, for a 1-D long signal obtained by a digital laser Doppler vibrometer, it is not necessary to process each sampling points on time axis. As the WFR can extract the instantaneous frequency (velocity) at any point along time axis, it is reasonable to process sampling points with certain time intervals. Instantaneous displacement can be obtained by a numerical integration. Hence, the phase unwrapping along time axis is avoided. This has the effect of dramatically reducing the processing time. However, when the displacement is extracted by integration, it is possible to generate an accumulated error. This accumulated error may generate a DC offset when transient displacement is measured, but it can be easily removed when only vibration is of concern.

A Wavelet ridge detection algorithm is a variation of WFR, but the processing window size is varied automatically according to the frequency of the signal. Wavelet ridge detection has an advantage over WFR in cases where the frequency of the signal varies dramatically. However, in this application, the frequency fluctuations are not obvious compared to the virtual frequency shift by the target beams. Hence, WFR can still be used to process the signal at different frequency bands. In some instances it can be more practical to avoid some unexpected errors generated by wavelet analysis when a window size is varying automatically. Of the three techniques discussed here to bypass the cross talk problem (PLL, Fourier analysis and WFR), the first two are suitable for both analog and digital decoding, whereas WFR is only suitable for digital decoding.

Optionally the order of the frequency shifter/splitters may be reversed. Also, the frequency shifter/splitter may comprise a pair of elements, one which merely splits a target beam into multiple target beams and another which only shifts the frequency of the target beams.

FIG. 3 shows another embodiment where instead of ten target beams, twenty target beams are used to make multi-point measurements of the target 12. The number of target beams can be readily varied as needed. As with the first embodiment, laser 21 generates a laser beam which is split by beamsplitter 22 into a target beam and a reference beam. The reference beam is routed to the photodetector 18 as before. The target beam is split by a third frequency shifter/splitter. Here, the third frequency shifter/splitter can be a combination of a second beamsplitter 23 and at least one frequency shifter 35. In the embodiment shown in FIG. 3, a pair of frequency shifters 35 and 36 are used, one for each of the pair of target beams. Frequency shifters can shift the frequency of their corresponding target beam by different amounts. For example, shifter 35 can comprise a fibre based acousto-optic modulator with a 250 MHz upshift, while shifter 36 can comprise a fiber based acousto-optic modulator with a 50 MHz upshift. Thus, the pair of target beams each has a different frequency.

Each of the pair of target beams would have a polarization controller 34, 35, which condition the beams in much the same manner as polarization controllers 13 in the first embodiment. GRIN lenses 37 may also be optically positioned between the beamsplitter 23 and the other frequency shifter/splitters. First and second shifter/splitters comprise a Bragg cell 38, and Raman-Nath frequency shifter. Mirrors 39 and focusing lenses 40 may be used as shown in FIG. 3. The combination of frequency shifter/splitters in this embodiment produces twenty target beams. Each target beam has a frequency different than every other target beam. FIG. 4 provides an example of an array of target beams, with frequencies in MHz provided.

A polarizing beamsplitter 31 may be postioned within a telescoping system used to focus and control the target beams. The polarizing beamsplitter functions in the same manner as the first embodiment. The telescoping system comprises a series of lenses 42, 44, a ¼ wave plate 45 and an imaging lens 46. In the embodiment shown in FIG. 3 the polarizing beamsplitter is positioned between the lenses 42 and 44. Target beams are routed to a beam receiver 16 and combined with the reference beam at single mode fibre coupler 22.

Use of the plurality of target beams illuminates multiple points on the target. The reflected beams interfere with the reference beam and are directed to a photodetector. In accordance with a highly advantageous feature, a single photodetector is all that is required to allow for precise measurement of multiple points on the target simultaneously. This advantageously allows for detection of transient events without requiring multiple detectors and/or moving parts for continuous scans.

From the foregoing disclosure and detailed description of certain embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A laser vibrometer for making non-contact measurements of vibrations of a target, comprising, in combination:
   a laser configured to produce a laser beam;
   a beamsplitter configured to split the laser beam into a reference beam and a first target beam;
   a first frequency shifter/splitter configured to split the first target beam into at least a pair of target beams each having a frequency different than a frequency of other target beams; and
   a detector, wherein the target beams are reflected from the target to the detector, and the reference beam is combined with the target beams such that the detector is configured to receive the target beams and reference beam together.

2. The laser vibrometer of claim 1, further comprising a polarizing beamsplitter optically positioned between the first frequency shifter/splitter and the target.

3. The laser vibrometer of claim 1, further comprising a second frequency shifter/splitter optically positioned between the beamsplitter and the target and configured to split the target beams into more target beams, with each target beam having a frequency different than a frequency of other target beams.

4. The laser vibrometer of claim 3, further comprising a third frequency shifter/splitter optically positioned between the beamsplitter and the target, and configured to split the target beam into more target beams, with each target beam having a frequency different than a frequency of the other target beams.

5. The laser vibrometer of claim 4, wherein the frequency shifter/splitter each comprise one of a Raman-Nath frequency shifter, a Bragg frequency shifter, and a combination of a second beamsplitter and a shifter.

6. The laser vibrometer of claim 5, wherein the second beamsplitter is a single mode fiber coupler and the shifter comprises an acoustic optic modulator for each target beam which adjusts the frequency of each target beam.

7. The laser vibrometer of claim 4, wherein there are twenty target beams.

8. The laser vibrometer of claim 3, wherein one of the frequency shifter/splitter is a Raman-Nath frequency shifter and the other of the frequency shifter/splitter is a Bragg frequency shifter.

9. The laser vibrometer of claim 3, wherein there are ten target beams.

10. The laser vibrometer of claim 1, further comprising a shifter which shifts the frequency of the target beam.

11. The laser vibrometer of claim 10, wherein the shifter is optically positioned between the laser and the first frequency shifter/splitter.

12. The laser vibrometer of claim 11, wherein the shifter is an acousto-optic modulator.

13. The laser vibrometer of claim 1, wherein the combined reference beam and target beams form an interference signal, and a processor is adapted to use one of Phase locked loop (PLL), Windowed Fourier Ridge (WFR) processing and wavelet ridge processing to demodulate the signal.

* * * * *

UNITED STATES PATENT AND TRADEMARK OFFICE
CERTIFICATE OF CORRECTION

PATENT NO. : 8,621,931 B2
APPLICATION NO. : 13/069281
DATED : January 7, 2014
INVENTOR(S) : Poh Boon Phua and Yu Fu It is certified that error appears in the above-identified patent and that said Letters Patent is hereby corrected as shown below:

In the Specification

Column 1, line 38 – Replace "laser doppler" with --laser Doppler--

Column 1, line 40 – Replace "laser doppler" with --laser Doppler--

Column 2, line 17 – Replace "particular useful" with --particularly useful--

Column 3, line 56 – Replace "advantageous" with --advantageously--

Column 4, line 1 – Replace "beam splitter" with --beamsplitter--

Column 4, line 8 – Replace "is to" with --is sent to--

Column 4, line 20 – Replace "beam have" with --beam may have--

Column 4, line 36 – Replace "phase locked loop" with --Phase Locked Loop--

Column 5, line 5 – Replace "windowed Fourier ridge" with --Windowed Fourier Ridge--

Column 5, line 15 – Replace "time is larger" with --time is longer--

Column 5, line 17 – Replace "sampling points" with --sampling point--

Column 5, line 19 – Replace "along time" with --along the time--

Column 5, line 22 – Replace "along time" with --along the time--

In the Claims

Column 7, Claim 6, line 15 – Replace "fiber coupler" with --fibre coupler--

Column 8, Claim 12, line 16 – Replace "locked loop" with --Locked Loop--

Signed and Sealed this
Twenty-ninth Day of July, 2014

Michelle K. Lee
*Deputy Director of the United States Patent and Trademark Office*

Page 1 of 1